Aug. 18, 1959   B. S. O. ALMÉN   2,899,738
CUTTING TOOL
Filed Sept. 12, 1955
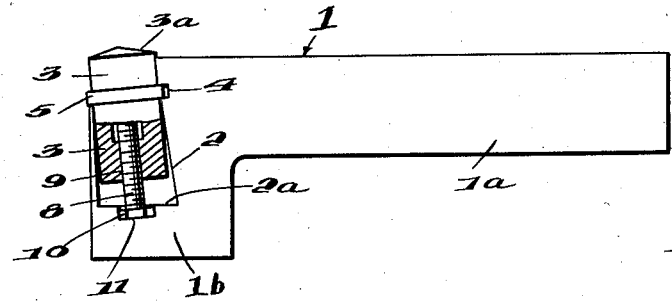
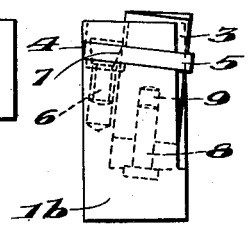
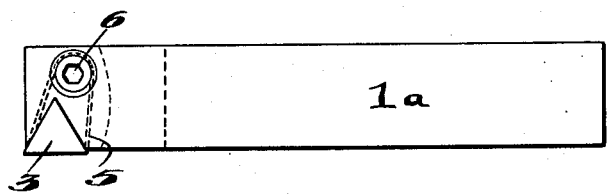
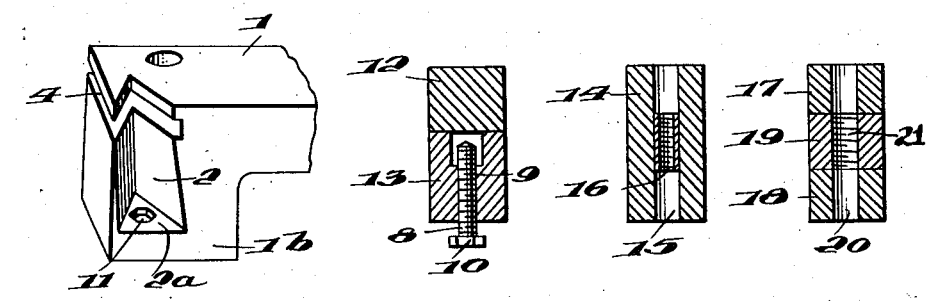
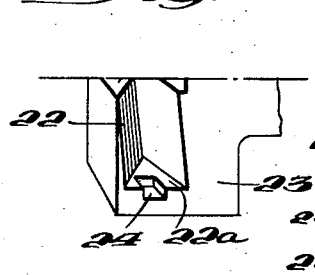
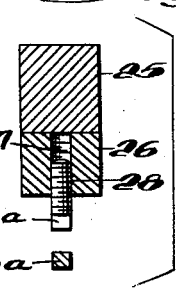
INVENTOR
BENGT SVEN OLOF ALMEN
BY Pierce, Scheffler & Parker
ATTORNEYS

United States Patent Office 2,899,738
Patented Aug. 18, 1959

2,899,738
CUTTING TOOL

Bengt Sven Olof Almén, Sandviken, Sweden, assignor to Sandvikens Jernverks Aktiebolag, Sandviken, Sweden Application September 12, 1955, Serial No. 533,664

Claims priority, application Sweden September 11, 1954

4 Claims. (Cl. 29—96)

This invention relates to cutting bits and holders therefor for use on lathe and like metalworking machines and has for its principal object the provision of a novel cooperating structure as between the bit and its holder by means of which the bit may be assembled with its holder in such manner that the bit is supported by the holder in a rigid manner, is easily removable from the holder for replacement, and is readily adjustable in the holder to compensate for the wearing away of the edge of the bit as the cutting progresses. It is a particular object of the invention to provide a novel means for "locking" the bit in a desired position of adjustment with respect to the bit holder and another particular object of the invention to provide a construction wherein no part of the adjusting means for the bit projects outside of the bounds of the bit holder itself.

It has long been conventional to utilize on chip cutting machines, and automatic lathes and single high producing lathes, a type of cutter bit holder and cutter bit in which the holder is constituted by a shank portion adapted to be held at one end on the machine at a given cutting position, the cutter bit being removably secured to the holder at the opposite end of the shank portion. The cutter bit usually has a prismatic form and is received in a recess of corresponding configuration provided in the holder, a clamping device being provided for securing the bit body in the recess. Adjustments in height of the cutting edge of the bit have been provided by means of an adjusting screw extending through the bottom face of the bit holder. Such a construction is typified by the disclosure in United States Patent No. 2,649,647 issued August 25, 1953 to Solon A. Sternbergh et al.

The construction shown in that patent suffers from two principal disadvantages which are typical of the disadvantages present in all prior known constructions within applicant's knowledge. First, because of the fact that the adjusting screw depends from the bottom face of the bit holder, much more operating space or clearance than is sometimes readily available must be provided for the bit holder component due to the projecting end of the adjustment screw. If space enough to accommodate the adjusting screw is not available, which is often the case with some of the more modern lathes, the bit holder must be so placed as to have an undesirably long overhang, or a special groove must be milled into the bit holder of the machine into which the screw may be inserted, or a plurality of adjustment screws of different length must be used, one after the other in succession as the edge of the bit wears down. The other principal drawback has been the difficulty in securing the bit in its holder so that there is no chance of having the bit, or more specifically the cutting edge of the bit slip from a preselected position of adjustment with respect to the bit holder and hence the work.

These two drawbacks are overcome by the improved construction in accordance with the present invention which is characterized in that an adjustment screw is threaded into the end face of the bit opposite the end on which the cutting edge is located, the end of said screw protruding from the end face of the bit and the screw end being received in a recess located in the bottom wall of the recess in the bit holder in which the bit is non-rotatably received. The configuration of the recess receiving the screw end corresponds to the configuration of the screw end (either the shank of the screw or a head provided on the shank) and consequently prevents any rotation of the screw relative to the bit since the bit cannot rotate in its recess. Moreover, the position of adjustment of the bit in its holder is determined by the threaded adjustment of the screw into the body of the bit.

The invention will be more readily understood from the following description and drawings of several different embodiments which are to be considered typical rather than limitative of the invention as defined in the appended claims. In the drawings;

Fig. 1 is a side view partly in section showing a bit and bit holder therefor embodying the invention;

Fig. 2 is an end view of the construction shown in Fig. 1;

Fig. 3 is a top plan view of the construction shown in Fig. 1;

Fig. 4 is fragmentary view in perspective showing the bit receiving end of the bit holder of Figs. 1–3;

Figs. 5, 6 and 7 are central longitudinal views in section of different constructions for the bit which receives the adjustment screw;

Fig. 8 is a view similar to Fig. 4 illustrating a somewhat modified configuration of the recess at the bottom of the bit receiving groove or recess in the bit holder; and Fig. 9 is a central longitudinal view in section of a type of bit and adjusting screw adapted to be supported in the bit holder of Fig. 8.

With reference now to the drawings and Figs. 1–4 in particular, the cutter bit holder is indicated generally by reference numeral 1 and includes a shank portion 1a of rectangular configuration adapted to be clamped at one end in its holder (not shown) on the machine. The holder 1 can be made from steel, or cast iron, or the like. At the end of the shank portion 1a opposite the clamping end, the holder terminates in a right angle offset 1b provided with a recess or groove 2 open along one face of the bit holder and which has a non-circular, e.g. polygonal configuration, adapted to slidably receive a bit 3 which has a similar configuration in order that there shall be no rotation of the bit about its longitudinal axis while supported in the groove 2. In the construction according to Figs. 1–4, the groove 2 has a triangular configuration and hence the bit 3 also has a triangular configuration and is thus prismatic. The bit 3 is provided with a cutting portion of hard material such as a sintered material containing, as hard material, one or more carbides, borides, silicides, oxides, etc.

The bit holder portion 1b is provided with a slot 4 arranged normal to and intersecting the recess or groove 2, into which slot is inserted a clamping device surrounding the body of the tool 3, for example a clamping ring 5. The clamping ring also surrounds a screw 6 or the like provided with a conical part 7 which acts in such a manner against the clamping device that the body of the cutter bit 3 can be clamped in the recess 2 by turning the screw 6 downwardly, i.e. clockwise as viewed in Fig. 3, or loosened by turning the screw 6 in the opposite direction. This particular clamping device is considered to be typical only, and hence other types of clamping devices can be used.

Vertical adjustment of the bit 3 in the groove 2 of the holder is effected in accordance with the invention by means of a screw 8 which threads into a threaded bore 9 extending longitudinally and preferably centrally into the body of the bit 3 from the bottom end thereof, i.e. from the end of the bit opposite that at which the cutting edges 3a are provided. The screw 8 is provided with a non-circular head 10 which is received in a recess 11 of corresponding configuration provided in the bottom wall 2a of the groove 2. In the embodiment of Figs. 1-4, the head 10 of screw 8 has a hexagonal configuration and hence the recess 11 is also configured hexagonally. The purpose for this arrangement is to prevent any possibility of the screw 8 from turning once it has been preliminarily adjusted with respect to the bit 3 prior to inserting the assembly of the bit 3 and screw 8 in the groove 2 for clamping by the screw 6. Consequently it is impossible for the bit 3 to change its position of adjustment with respect to the bit holder 1. Moreover, since the head of the adjustment screw 8 terminates within the body of the portion 1b of the bit holder, there is no longer the problem of having to accommodate protruding ends of adjustment screws.

Thus, as will be apparent from the above description and from the drawings, a preliminary adjustment of the screw 8 longitudinally with respect to the bit 3 is made prior to insertion of the bit in the recess 2 of the tool holder 1. The degree to which the screw 8 is threaded into the bore 9 may be determined by comparison with a standard dimension, such as the overall dimension from the tip of the cutting bit to the extremity of the screw head 10 as measured by calipers, for example. The bit is then inserted into the recess 2 and the non-circular screw head 10 will be received in the corresponding non-circular recess 11 in the bottom of recess 2. The clamping ring 5 is then secured to the holder 1 by means of the locking screw 6 and a rigid assemblage is achieved.

Should it then be desired to vertically adjust the bit within the recess 2 without completely removing the same from the holder, screw 6 is first rotated to relieve clamping pressure of clamping ring 5. The bit 3 is then moved upwardly until the screw head 10 is free from the recess 11, and the screw 8 may then be rotated manually or by suitable tool means to adjust the linear distance between the head 10 and the adjacent lowermost surface of the bit as might be desired. The screw 6 is then retightened to firmly secure the bit 3 within the recess 2.

Fig. 5 shows in more detail the construction for the bit or cutter 3 illustrated in Figs. 1-4. In this view it will be seen that the bit 3 has an upper section 12 of hard, cutting material such as one of the carbides previously mentioned, and a lower section 13 to which it is brazed or welded made of an easily machinable metal, for example a steel alloy having the same or substantially the same coefficient of longitudinal expansion as the hard metal 12 in order to avoid injurious brazing stresses. The lower section 13 of course is provided with the threaded longitudinal central bore 9 which receives the screw 8.

A slightly different construction for the bit body is illustrated in Fig. 6. Here the bit is seen to be comprised of a body portion 14 which is made entirely out of the hard cutting material and is provided with a central longitudinal bore 15 which extends completely through the body. For receiving the adjustment screw 9, a female threaded insert 16 is positioned within the bore 15.

In the construction according to Fig. 7 the bit is seen to be comprised of an upper section 17 of hard i.e. carbide material, a lower section 18 of the same hard material and an intermediate section 19 of an easier machinable metal, the sections being brazed or welded together. A central longitudinal bore 20 extends through all of the sections 17-19 and that part of the bore 20 within the intermediate section 18 is threaded at 21 in order to receive the adjustment screw 9, not shown.

Figs. 8 and 9 illustrate still a different embodiment for the invention. In these views it will be seen that the bottom wall 22a of the recess 22 in the bit holder 23 is provided with a recess 24 of rectangular configuration and that the bit body consists of an upper hard metal portion 25 for cutting, and a lower portion 26 of a more easily machinable metal brazed to the upper portion 25, the lower portion 26 being provided with a central longitudinal threaded bore 27 for receiving the adjustment screw 28. The lower end of screw 28 is headless and differs to that extent from the screw 9 previously described. However the functions are the same since the lower end 28a of screw 28 is given the same size and configuration as the recess 24 in order that there shall be no possibility of any turning of the screw 28 in the body of the bit after the lower end 28a of the screw 28 is seated in its recess 24, the latter being open at one side.

In conclusion it will be understood that while various embodiments of the invention have been described and illustrated, various minor changes in the construction and arrangement of component parts may be made without, however, departing from the spirit and scope of the invention as defined in the appended claims.

I claim:

1. In a cutting tool including a holder having therein a recess with a solid bottom wall and a cutter bit slidably and non-rotatably extending within said recess, said cutter bit having a cutting edge at the upper end thereof and a threaded bore extending longitudinally therein from the opposite lower end thereof, an adjustment screw threaded into said bore and protruding from the lower end of said cutting bit, said adjustment screw terminating at its lower extremity in a non-circular head, means in the bottom wall of said recess restricting said adjustment screw against rotary movement relative to said holder and said bit comprising a second recess in the bottom wall of said holder recess, said second recess having a non-circular configuration corresponding to the head of said screw, said screw head extending into said second recess, and clamping means connected to said holder and securing said cutting bit within said holder recess.

2. In a cutting tool having a cutting bit and a holder therefor, the improvement wherein said holder includes a recess having a solid bottom wall, said cutting bit extending partially into said recess, said cutting bit including a lower first portion of easily machinable metal adjacent the recess bottom and an upper second portion of relatively hard material having a cutting edge thereon extending from said recess, said first and second portions having substantially the same coefficient of expansion, said bit first portion having a threaded bore extending longitudinally therein, an adjustment screw threadably connected in said bore and projecting from the lower end of said bit, said adjustment screw terminating at its lower extremity in a non-circular head, means in the bottom of said recess restricting said adjustment screw against rotary movement relative to said holder and said bit comprising a second recess in the bottom wall of said holder recess, said second recess having a non-circular configuration corresponding to the head of said screw, said screw head extending into said second recess, and clamping means connected to said holder and securing said cutting bit within said holder recess.

3. In a cutting tool having a cutting bit and a holder therefor, the improvement wherein said holder includes a recess having a solid bottom wall, said cutting bit extending partially into said recess, said cutting bit having a body of relatively hard material with a cutting edge thereon extending from said recess, said body having also a longitudinal bore therein, and an insert of easily machinable metal rigidly mounted in the bore of said cutting bit body, said insert having a threaded bore therein, an adjustment screw threadably connected in the bore of said insert and projecting from the lower end of said bit, said adjustment screw terminating at its lower extremity in a non-circular head, means in the bottom of said recess restricting said adjustment screw against rotary movement relative to said holder and said bit comprising a second recess in the bottom wall of said holder recess, said second recess having a non-circular configuration corresponding to the head of said screw, said screw head extending into said second recess, and clamping means connected to said holder and securing said cutting bit within said holder recess.

4. In a cutting tool having a cutting bit and a holder therefor, the improvement wherein said holder includes a recess having a solid bottom wall, said cutting bit extending partially into said recess, said cutting bit having first and second outer portions of relatively hard material and an intermediate portion of more easily machinable metal, said intermediate and outer portions having the same coefficient of expansion, a bore extending longitudinally through said intermediate and outer tool portions, said bore in said intermediate portion being threaded, an adjustment screw threadably connected in the threaded bore of said intermediate portion and projecting from the lower end of said bit, said adjustment screw terminating at its lower extremity in a non-circular head, means in the bottom of said recess restricting said adjustment screw against rotary movement relative to said holder and said bit comprising a second recess in the bottom wall of said holder recess, said second recess having a non-circular configuration corresponding to the head of said screw, said screw head extending into said second recess, and clamping means connected to said holder and securing said cutting bit within said holder recess.

References Cited in the file of this patent

UNITED STATES PATENTS

| | | |
|---|---|---|
| 1,090,205 | Gorton | Mar. 17, 1914 |
| 1,970,016 | Morton | Aug. 14, 1934 |
| 2,370,273 | Ulliman | Feb. 27, 1945 |
| 2,537,274 | Le May | Jan. 9, 1951 |
| 2,649,647 | Sternberg | Aug. 25, 1953 |
| 2,683,302 | Badger | July 13, 1954 |
| 2,687,563 | Bader | Aug. 31, 1954 |
| 2,751,663 | Leuzinger | June 26, 1956 |